United States Patent [19]
Jack

[11] Patent Number: 5,689,087
[45] Date of Patent: Nov. 18, 1997

[54] INTEGRATED THERMOPILE SENSOR FOR AUTOMOTIVE, SPECTROSCOPIC AND IMAGING APPLICATIONS, AND METHODS OF FABRICATING SAME

[75] Inventor: Michael D. Jack, Goleta, Calif.

[73] Assignee: Santa Barbara Research Center, Goleta, Calif.

[21] Appl. No.: 322,442

[22] Filed: Oct. 4, 1994

[51] Int. Cl.$^6$ .................................................. H01L 35/02
[52] U.S. Cl. .......................... 136/213; 136/224; 136/225; 136/230; 136/238; 136/239; 136/240; 374/179; 374/208
[58] Field of Search ..................... 136/200, 205, 136/206, 211, 212, 213, 214, 215, 216, 223, 224, 225, 230, 238, 239, 240, 241; 374/179, 208

[56] References Cited

U.S. PATENT DOCUMENTS

| | | | |
|---|---|---|---|
| 3,293,082 | 12/1966 | Brouwer et al. | 136/206 |
| 3,436,274 | 4/1969 | Villers | 136/224 |
| 3,758,830 | 9/1973 | Jackson | 317/234 R |
| 3,761,318 | 9/1973 | McHenry | 136/225 |
| 4,211,888 | 7/1980 | Stein et al. | 136/225 |
| 4,456,919 | 6/1984 | Tomita et al. | 357/28 A |
| 4,558,342 | 12/1985 | Sclar | 357/30 |
| 4,571,608 | 2/1986 | Johnson | 357/28 |
| 5,156,688 | 10/1992 | Buhler et al. | 136/211 |
| 5,462,608 | 10/1995 | Gschwind et al. | 136/203 |

FOREIGN PATENT DOCUMENTS

| 64-64269 | 3/1989 | Japan | 136/200 |
|---|---|---|---|

OTHER PUBLICATIONS

"A Batch–Fabricated Silicon Thermopile Unfrared Detector", G.R. Lahiji and Kensall D. Wise, IEEE Transactions On Electron Devices, vol. Ed–29, No. 1, Jan. 1982, pp. 14–22.

"A Linear Thermopile Infrared Detector Array With On–Chip Multiplexing", I.H. Choi and K.D. Wise, IEEE publication, 1985, pp. 132–135 No month available.

"A Silicon–Thermopile–Based Infrared Sensing Array For Use In Automated Manufacturing", I.H. Choi and K.D. Wise, IEEE Transactions On Electron Devices, vol. Ed–33, No. 1, Jan. 1986, pp. 72–79.

"The Role Of Thin Films In Integrated Solid–State Sensors", K.D. Wise, J. Vac. Sci Technol. A. vol. 4, No. 3, pp. 617–622, May/Jun. 1986.

*Primary Examiner*—T. Tung
*Assistant Examiner*—Chrisman D. Carroll
*Attorney, Agent, or Firm*—W. C. Schubert; W. K. Denson-Low

[57] ABSTRACT

A highly integrated thermal sensor (10) is responsive to radiation having wavelengths within a predetermined band of wavelengths. The sensor, which may be a thermopile, is comprised of a substrate (16) comprised of at least one semiconductor material. The substrate includes at least one active region disposed within a first surface of the substrate. The sensor further includes a plurality of thermally-responsive junctions (HJ, CJ) between dissimilar materials (22, 24) that are disposed within the at least one active region, wherein at least one of the thermally-responsive junctions is a hot junction. The hot junction is thermally isolated from the substrate by being suspended from the substrate on dielectric bridges or, in another embodiment, by a thermally insulating and patterned polymer. In a backside illuminated embodiment of this invention the sensor further includes an optical cavity (26) formed within a second surface of the substrate in registration with the active region. The optical cavity includes a radiation absorbing region (28) that is thermally coupled to the at least one hot junction. The sensor further includes an optical filter (30) that is disposed over the optical cavity for admitting radiation within the predetermined band of wavelengths into the optical cavity for absorption by the radiation absorbing region.

33 Claims, 9 Drawing Sheets

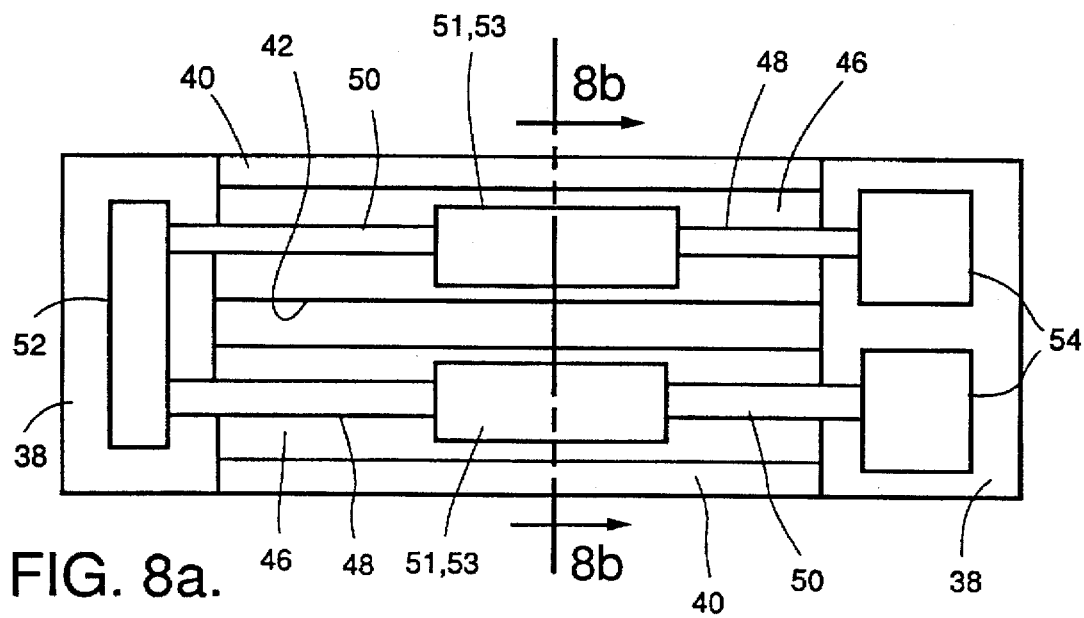
FIG. 8a.
FIG. 8b.
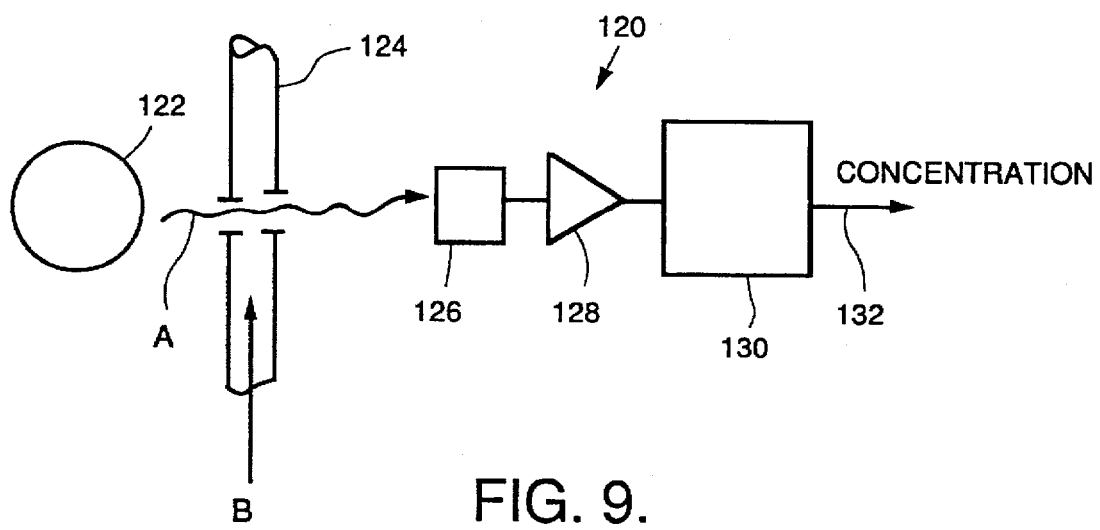
FIG. 9.

INTEGRATED THERMOPILE SENSOR FOR AUTOMOTIVE, SPECTROSCOPIC AND IMAGING APPLICATIONS, AND METHODS OF FABRICATING SAME

FIELD OF THE INVENTION

This invention relates generally to detectors of thermal radiation and, in particular, to thermopile sensors.

BACKGROUND OF THE INVENTION

A thermopile is comprised of a plurality of thermocouples that are connected in series. Each thermocouple relies on the generation of the well known Thomson and Peltier emfs that result from a temperature gradient across a junction between two dissimilar metals. A combination of the Thomson and Peltier effects produce the Seebeck emf which is used in thermocouples.

In general, a thermopile radiation receiver has a first set of junctions (hot junctions) that make good thermal contact with a radiation receiver (e.g., a black body) but which are electrically insulated from the radiation receiver. A second set of junctions (cold junctions) are attached to a support which does not receive the radiation and which is therefore at a lower temperature. The incident radiation raises the temperature of the radiation receiver and produces a voltage output from the thermopile that is proportional to the energy absorbed. That is, the thermopile output voltage is proportional to a temperature difference and is, therefore, proportional to the total radiation energy received.

As such, the responsivity of a thermopile sensor depends primarily on the nature of the bimetal contact and is, in general, uniform. When used as an infrared (IR) detector the voltage response of the thermopile may be a factor of 10 to 100 times lower than that of a resistive bolometer or of a pyroelectric detector. However, the lower responsivity of the thermopile detector is offset by a superior noise floor, 1/f drift, uniformity, and reproducibility characteristics, as compared to the bolometer and pyroelectric types.

One long standing drawback to the use of thermopile detectors as linear and area arrays in high performance thermal energy sensors has been a lack of a suitable dielectric isolation process that is compatible with conventional integrated circuit processing techniques, such as those used for very large scale integration (VLSI) integrated circuits. Other recognized drawbacks have included a lack of a suitable low noise silicon circuit that is impedance matched to the thermopile junction or junction string; and a difficulty in integrating both passband filters and thermal absorbing layers locally within a small region that includes the bi-metal junctions.

Thermopile detectors are known to have been constructed on $Al_2O_3$ membranes and on silicon dielectric membranes. However, this latter approach may require special and complex "Back-End" processes such as backside etching with anisotropic etches, deep B+ implants, and multiple additional dielectric and metal deposition layers. Reference in this regard is made to the following articles: G. R. Lahiji and K. D. Wise, IEEE Transactions on Electron Devices, V. ED-29, p. 14, January 1982; I. H. Choi and K. D. Wise, "A Linear Thermopile Infrared Detector Array with On-Chip Multiplexing", IEEE publication, 1985, p.132; I. H. Choi and K. D. Wise, IEEE Transactions on Electron Devices, V. ED-33, p. 72, January 1986; and K. D. Wise, J. Vac. Sci Technol. A. Vol. 4, No. 3, p. 617, May/June 1986.

OBJECTS OF THIS INVENTION

It is one object of this invention to provide embodiments of novel thermal detectors, and methods for fabricating same, that overcome the foregoing and other problems.

It is a further object of this invention to provide embodiments of thermopile detectors that are constructed so as to provide low cost, highly integrated sensors of infrared (IR), visible and ultraviolet (UV) radiation, including both single element thermopile detectors and arrays comprised of a plurality of thermopile detectors.

It is one further object of this invention to provide embodiments of thermopile detector arrays that are constructed with a dielectric isolation process that is compatible with VLSI processing; that employs a low noise silicon circuit that is impedance matched to the thermopile junction or junction string; and that integrates both filters and absorbing layers locally in the region of the thermopile bi-metal junctions.

SUMMARY OF THE INVENTION

The foregoing and other problems are overcome and the objects of the invention are realized by a highly integrated thermal energy sensor, and to methods for fabricating the thermal energy sensor. In accordance with this invention the sensor, which may be a thermopile responsive to IR radiation, includes a substrate comprised of at least one semiconductor material. The substrate has at least one active region disposed within a first surface of the substrate. The sensor further includes a plurality of thermally-responsive junctions between dissimilar materials that are disposed within the at least one active region, wherein at least one of the thermally-responsive junctions is a hot junction. The hot junction is thermally isolated from the substrate by being suspended from the substrate by dielectric bridges or, in another embodiment, by a thermally insulating and patterned region which may be comprised of a polymer.

In a backside illuminated embodiment of this invention the sensor further includes an optical cavity formed within a second surface of the substrate in registration with the active region. The optical cavity includes a radiation absorbing region that is thermally coupled to the at least one hot junction. In the backside illuminated embodiment the sensor further includes an optical filter that is optically coupled to the optical cavity for admitting radiation within a predetermined band of wavelengths into the optical cavity for absorption by the radiation absorbing region.

The dissimilar materials are selected from the group consisting essentially of bismuth, antimony, polysilicon, bulk silicon, amorphous silicon, metal silicides including PtSi, PdSi, ErSi, metal germanides including PdGe, conductive metal nitrides, and high Seebeck coefficient materials including Te and BiTe.

In accordance with this invention the thermal energy sensor may further include support circuitry that is fabricated within the first surface of the substrate, the support circuitry being coupled to the plurality of thermally-responsive junctions.

By example, the plurality of thermally-responsive junctions are serially coupled together so as to have a first end and a second end, and the support circuitry includes a first transistor having a control terminal coupled to the first end and a second transistor having a control terminal coupled to the second end. The first and second transistors may each be a bipolar junction transistor (BJT), and the control terminals then are base terminals of the BJTs.

BRIEF DESCRIPTION OF THE DRAWINGS

The above set forth and other features of the invention are made more apparent in the ensuing Detailed Description of the Invention when read in conjunction with the attached Drawings, wherein:

FIGS. 2a–2c are cross-sectional views, not to scale, that illustrate a method for fabricating a frontside illuminated thermopile detector using an isoplanar implanted (buried) oxide approach, while

FIGS. 3a–3g are cross-sectional views, not to scale, that illustrate a method for fabricating a frontside illuminated, thermally isolated thermopile detector using a buried oxide process, while

FIG. 5b is a planar view showing the overlapping layers that comprise each individual thermocouple;

FIGS. 6a–6e are cross-sectional views, not to scale, illustrating a frontside illuminated, silicon-on-sapphire (SOS) processing embodiment for forming a thermally isolated thermopile detector, while

FIG. 8a is a top view of a frontside illuminated thermopile detector constructed in accordance with the method of FIGS. 2a–2c, while FIG. 8b is a cross-sectional view taken along the section line B—B of FIG. 8a; and FIG. 9 is a simplified block diagram showing the use of integrated thermopile detector of this invention in an application that senses the concentration of a molecular species of interest within a gas flow.

DETAILED DESCRIPTION OF THE INVENTION

Reference is made to FIGS. 1a–1d for illustrating a first method of this invention for fabricating a backside illuminated thermopile detector using a bonded silicon wafer 10. Although a single thermal energy detector is illustrated in these figures, it should be realized that a large number of identical thermal energy detectors can be simultaneously fabricated as a linear or as a two dimensional area array.

Figure 1A:
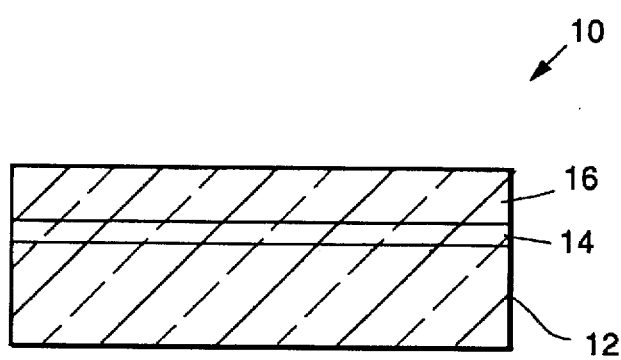
FIGS. 1a–1c are cross-sectional views, not to scale, that illustrate a method for fabricating a backside illuminated thermopile detector using a bonded silicon wafer, the detector being formed to include a radiation absorbing coating and a narrowband filter.

Processing begins in FIG. 1a with a thinned silicon-on-insulator (SOI) wafer 10 comprised of a substrate 12, an electrically insulating (dielectric) layer (SiO$_2$) 14, and a thin silicon <100> layer 16. By example, the substrate 12 has a thickness of approximately 100 micrometers to approximately 500 micrometers, the SiO$_2$ dielectric layer 14 a thickness of approximately 10,000 Angstroms, and the silicon film layer 16 has a thickness within a range of approximately 2 micrometers to approximately 50 micrometers. Bonded silicon "wafers" having these characteristics are commercially available, or may be fabricated using known techniques.

Figure 1B:
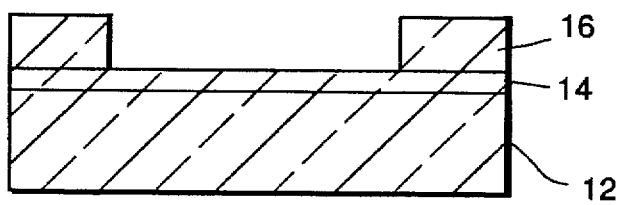

In FIG. 1b the Si layer 16 is processed to form a recess 18. An etch using KOH is one suitable technique for forming the recess 18, in that the oxide layer 16 functions as an etch stop.

Figure 1C:
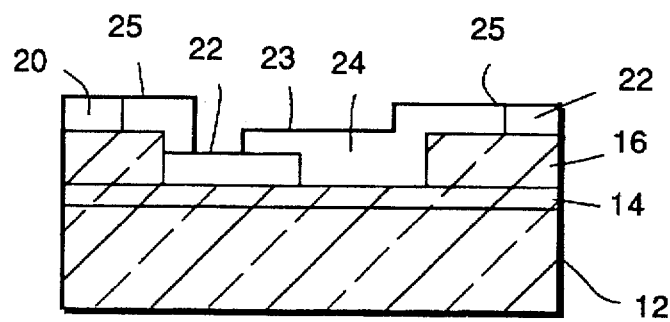

In FIG. 1c there is performed a step of suitably masking and then depositing multiple (two or three) metal layers 20, 22 and 24 to form the thermal detector, in this case a thermopile. Examples of bilayer or trilayer thermopile formation include the use of Au, Bi, and Sb films (20, 22, and 24, respectively), wherein a temperature gradient is induced between the hot Bi/Sb (bilayer) or Bi/Au/Sb (trilayer) junctions (HJ 23) and the cold Bi/Sb (bilayer)—Bi/Au/Sb (trilayer) junction (CJ 25). The hot junction 23 is formed over the region with no silicon (i.e., upon the low thermal conductivity bonding oxide 14) and the cold junctions 25 are formed on the surrounding silicon regions. Suitable thicknesses for the metal layers are 1000 Å for the Bi, 2500 Å for the Sb, and 0.5 microns for the Au. The ratio of the thickness of the Bi film to the Sb film (approximately 1:2.5) is maintained in all of the illustrated embodiments so as to equalize the thermal conductance over the entire metalized region. The Au layer is provided to efficiently couple the generated potential and may be replaced by any suitable high electrical conductivity material.

It is pointed out that this process is not restricted to thermopile formation, but could also be utilized to fabricate thermally variable thin film resistors i.e., materials which form bolometers (VOx), or superconducting transition edge bolometers (YBCO), or thin film pyroelectric detectors (e.g., BaSrTiO$_3$).

Figure 1D:
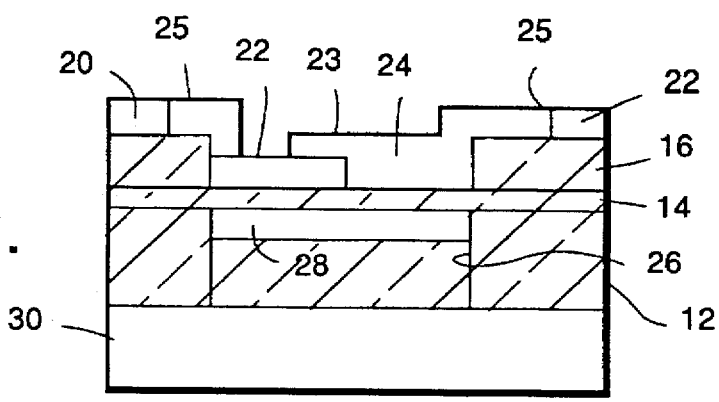

In FIG. 1d there is performed a step of thermally isolating the hot junction (HJ 23) by backside etching of the silicon substrate 12 to the etch stop represented by the bonding oxide layer 14. This forms an optically isolating cavity 26. The cavity 26 may have a depth within a range of approximately 120 microns to approximately 200 microns, depending upon the thickness of the substrate 12. The depth of the cavity 26 may also be selected to be a function of the wavelengths to be detected, thereby "tuning" the cavity to the desired range of wavelengths. The unique selectivity of certain etches to silicon over oxide, including the aforementioned KOH; or an "Ag-etch" containing AgNO$_3$ and HNO$_3$; or suitable plasma etches such as a SF$_6$, NF$_3$ or CCl$_2$F$_2$ over oxide, make the performance of the backside etch step possible.

Next, a thin film "dark" radiation receiving or absorbing region 28 is deposited upon the oxide 14 in registration with the backside of the hot junction 23. The absorbing region 28 is preferably comprised of a multilayered Ti/ZnSe structure, although the use of these materials do not represent a limitation upon the practice of this invention. The region 28 functions to convert incident electromagnetic radiation to thermal energy and to transfer the thermal energy, via the dielectric layer 14, to the hot junction (HJ 23) where the thermal energy is detected. A next step deposits or laminates an optical filter 30 that is registered to the thermopile detector element, the optical filter 30 defining the radiation receiving surface of the thermopile detector. Suitable filter fabrication techniques include bonding a filter to the backside of the silicon substrate 12, and depositing a multilayered dielectric filter stack having a passband that is selected for the wavelengths of interest. Techniques for specifying and fabricating such multilayered filter stacks are known in the art. The filter passband characteristics are selected as a function of the wavelength or range of wavelengths of interest.

For the case where the filter 30 is deposited upon the substrate 12, it is preferable to first fill the cavity with a sacrificial material (for example a polyimide), deposit the filter 30, open an aperture within the filter 30, and then etch to remove the sacrificial material from the cavity 26.

The process illustrated in FIGS. 1a–1d both shields from direct illumination any silicon electronics (for example, amplifier circuits) that may be formed in the silicon layer 16, and provides a high degree of optical isolation between individual thermopile detectors.

A second embodiment of this invention is illustrated in FIGS. 2a–2e, specifically a frontside illuminated, isoplanar-implanted SOI embodiment.

Figure 2A:
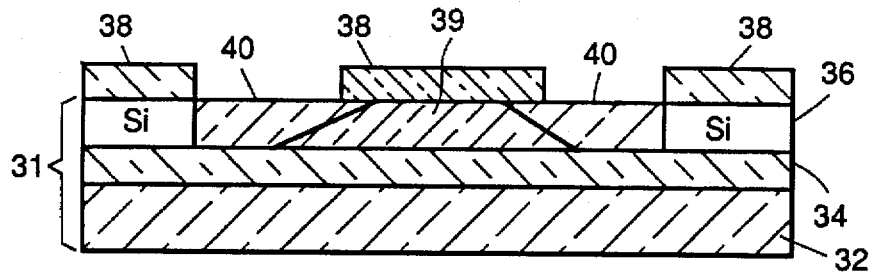

Processing begins in FIG. 2a with a silicon structure 31 into which oxygen is implanted to form an $SiO_2$ buried layer 34. A suitable oxygen implant depth, from the top surface of the silicon structure 31, is approximately 0.5 micrometers. The buried layer 34 thus differentiates the silicon structure into a lower substrate portion 32 and into an upper silicon portion or layer 36. An electrically insulating silicon nitride ($Si_3N_4$) dielectric layer 38 is deposited, masked, and then selectively removed to expose portions of the underlying silicon layer 36. Next, an isoplanar oxide 40 is grown into the exposed silicon through the use of a conventional technique. FIG. 2a illustrates the structure at the completion of the formation of the isoplanar oxide 40. The growth of the isoplanar oxide 40 results in the formation of a silicon pedestal 39 having sloping sidewalls. A portion of the oxide grows laterally, that is, beneath the silicon nitride layer 38.

Figure 2B:
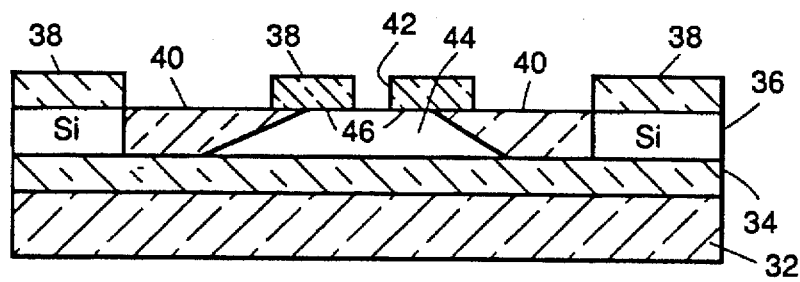

In FIG. 2b an aperture or slot 42 is etched through the silicon nitride layer 38 to expose the underlying silicon pedestal 39. The silicon pedestal 39 is then etched away through the slot 42, resulting in the formation of a void 44 that is surrounded by the isoplanar oxide 40. This slot may be conveniently self-aligned to the patterned thermopile detector. In this case, the thermopile detector is delineated prior to the photolithographic delineation/etching of the slot 42.

Figure 2C:
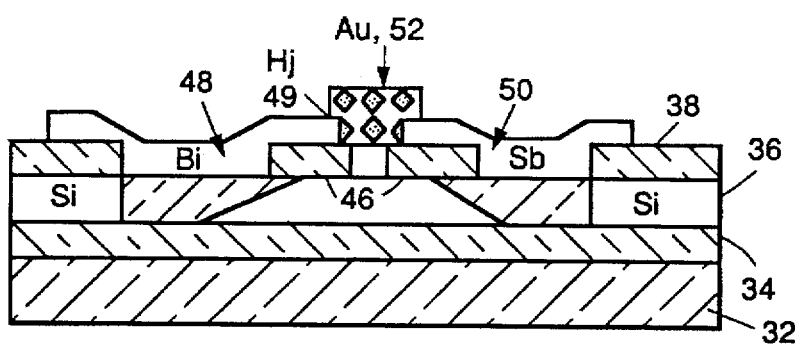

It can be seen in FIGS. 2b and 2c that the opening of the slot 42 and the subsequent etching away of the underlying silicon island or pedestal 39 causes the formation of silicon nitride strips or "bridges" 46. These bridges 46 are supported from the isoplanar oxide 40 and span the void 44 where the silicon pedestal 39 was removed. It is on these bridges 46 that the Bi/Sb HJ(s) are formed, as the combination of the void 44 and the dielectric silicon nitride bridges 46 serve to both electrically and thermally isolate the HJs from the surrounding silicon material.

The step illustrated in FIG. 2c is completed by the deposition of the Bi metalization 48, the Sb metalization 50, and the deposition of an electrically conductive strap or interconnect (Au 52) that electrically connects the Bi and Sb metalization 48 and 50, respectively, to form a hot junction 49 that is located upon the silicon nitride bridges and over the void 44.

Figure 2D:
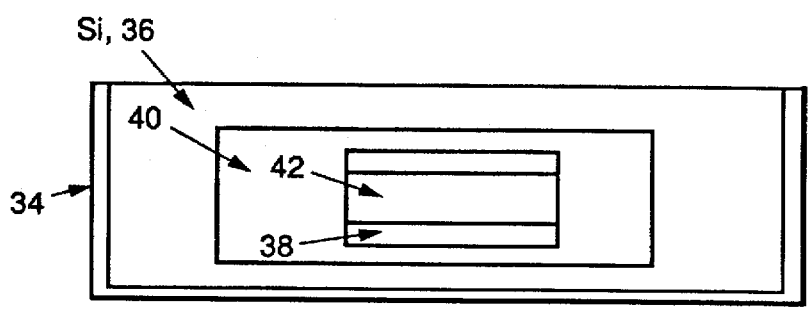
FIGS. 2d and 2e are planar views depicting the detector before (FIG. 2d) and after (FIG. 2e) the formation of the bi-metallic (Sb and Bi) thermocouples.
Figure 2E:
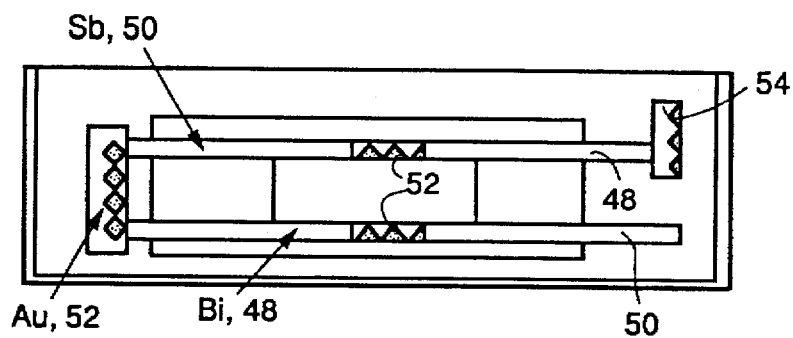

FIG. 2d is a planar view of the structure at the completion of the step of FIG. 2c. For a non-self aligned process (referring also to the planar view of FIG. 2e), the Bi, Sb, and Au metalization 48, 50, and 52, respectively, is deposited as shown to form the thermopile detector element. An external contact 54 is also defined and formed and may be connected to another thermopile detector (not shown). As in the embodiment of FIGS. 1a–1d, the cold junctions are formed on the silicon.

Referring also to FIGS. 8a and 8b, subsequent to the thermopile formation the radiation absorbing layers 51 and bandpass filters 53 are deposited and delineated on the hot junctions 49. The delineated filters are confined to a small area slightly larger than the hot junction itself to minimize the addition of extra thermal capacitance and to maintain fast response. The delineated slotted silicon nitride bridges 46 provide thermal isolation and rest on nitride dielectric 38 supports. The deposited and delineated thermopile is formed from the overlap of the Bi and Sb metalization lines 48 and 50. On this overlap region are deposited (delineated) both the radiation absorbing coating 51 and the dielectric filter 53. Contacts 54 are provided to interface the thermopile detector to external circuitry and/or to interface same to other thermopile detectors.

Further in accordance with this invention two buried oxide processes for forming manufacturable, high performance, low cost uncooled detectors are described below and illustrated in FIGS. 3a–3h and 4a–4d. These processes share several unique advantages over conventional techniques for forming thermally isolated detectors, including the use of fewer mask steps, the utilization of a planar process, the formation of a low induced stress in the deposited film layers, and an excellent selectivity for etching the thermally isolating cavity. In addition, these processes are compatible with, and may be integrated into, a fully standard integrated circuit process line.

Figure 3A:
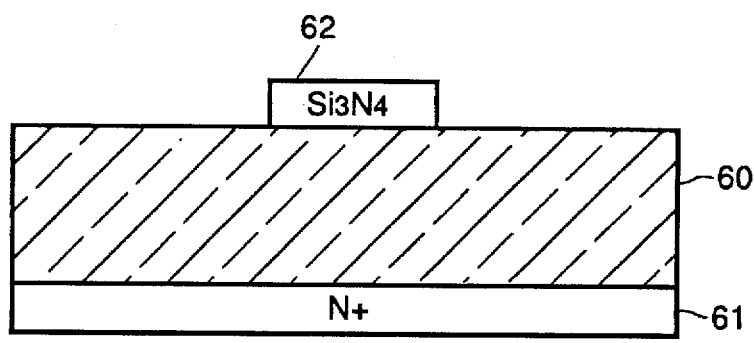

Processing begins in FIG. 3a by selecting a silicon substrate 60 that is suitable for the fabrication of silicon amplifier circuits. The substrate 60 has a region 61 that is doped $n^+$ and which is eventually used as a common electrical contact. A region 62 of silicon nitride is then deposited to define an extent of an active area or region which will eventually become a thermally isolating bridge structure. The bridge structure beneficially reduces the thermal conduction of the structure and increases the thermopile sensitivity.

Figure 3B:
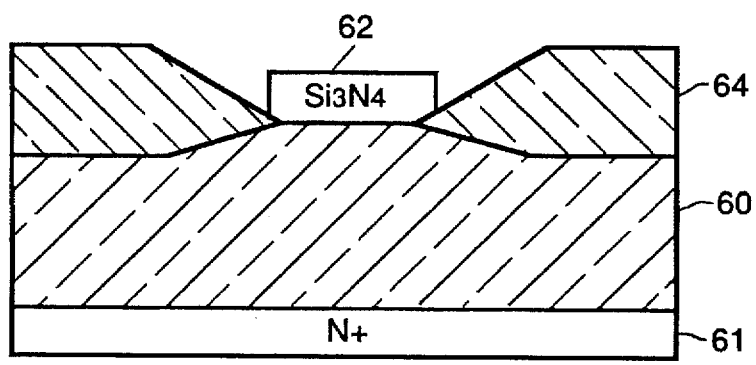

In FIG. 3b a relatively thick (1 to 2 micrometers) layer 64 of laterally isolating isoplanar oxide is grown by, for example, a "wet" oxidation process. A resulting underlap of the isoplanar oxide 64 and the silicon nitride 62 eventually supports the delineated silicon nitride bridges 64a that are shown in FIG. 3g. Optionally, a small amount of oxide can be grown on the silicon substrate 60 before the deposition of the silicon nitride region 62 and the patterning and growth of the isoplanar oxide layer 64. This thin layer of oxide (shown as layer 63 in FIGS. 4c and 4d) is employed to strengthen the silicon nitride bridges 64a.

Figure 3C:
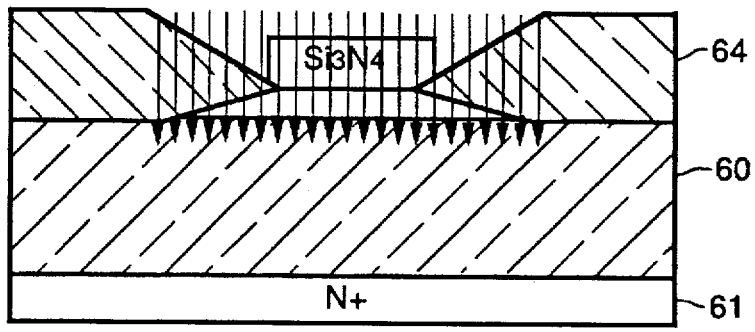
Figure 3D:
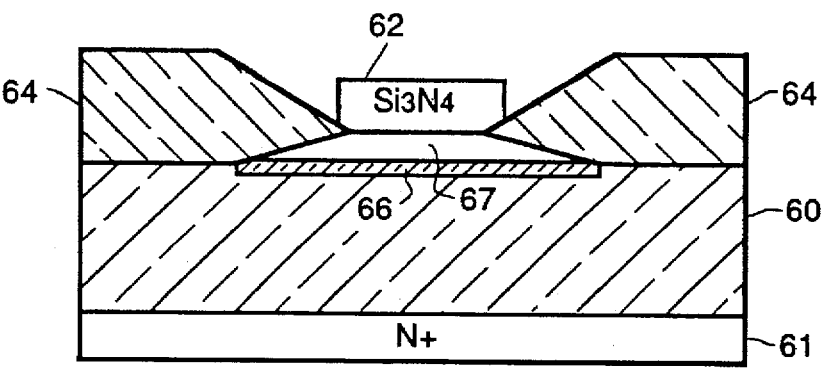

In FIGS. 3c and 3d oxygen is implanted though the silicon nitride 62 and the isoplanar oxide 64 to form a buried oxide layer 66 that is separated from the silicon nitride structure 62 by an intervening thin region 67 of the silicon 60. A suitable implant depth is 0.5 micrometers. The implanted oxygen is then annealed to form the layer 66 as a continuous buried oxide layer that underlies the previously defined active region (that region that underlies the silicon nitride region 62).

Figure 3E:
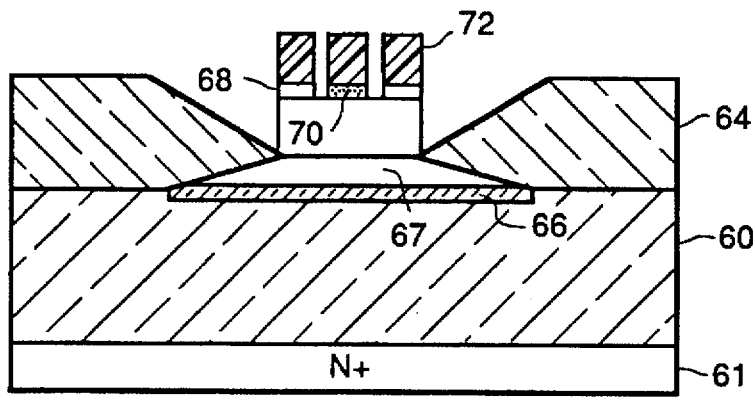
Figure 3F:
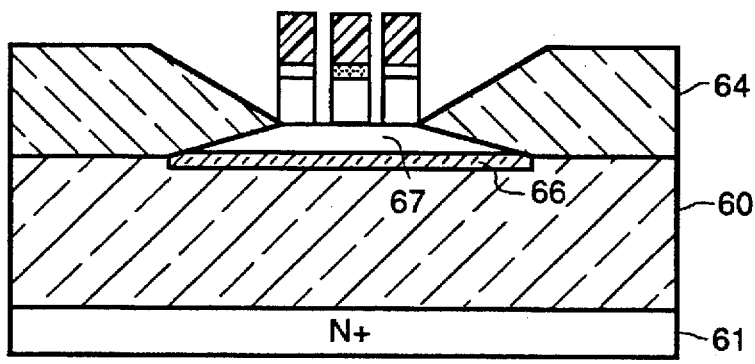
Figure 3G:
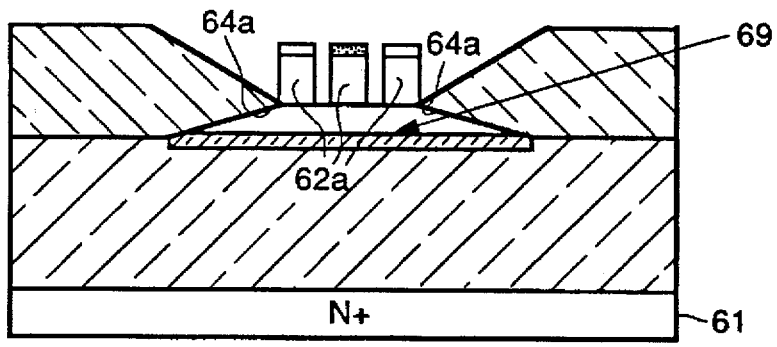

FIGS. 3e through 3g show sequentially the deposition and delineation of the thermocouples which lay across the nitride region 62. In particular, FIG. 3e shows the deposition of strips of Sb (68) and Bi (70), followed by the application of a layer of photoresist 72. FIG. 3f illustrates the patterning of the silicon nitride region 62 by removal of those portions thereof that are not covered by metalization and photoresist. The selective removal of the silicon nitride region 62 may be beneficially self-aligned to the previously applied mask that defines the thermopile pattern of the nitride bridges (one bridge to each thermocouple). In FIG. 3g the underlying thin region 67 of silicon that lies atop the buried oxide 66 is removed by a selective etch, thereby forming a void 69 that undercuts the remaining silicon nitride of the region 62 and the adjacent isoplanar oxide layer 64. This forms silicon nitride bridges 62a which are partially supported from that portion of the isoplanar oxide layer 64 that overhangs the void 69. The silicon nitride bridges 62a support and thermally isolate, in conjunction with void 69, the hot junctions of the thermopile detector. In the case shown in FIG. 4d the silicon nitride 62 and the silicon oxide under-layer 63 are both undercut, with the silicon oxide under-layer 63 providing additional strength for the isoplanar oxide bridges 64a.

Figure 3H:
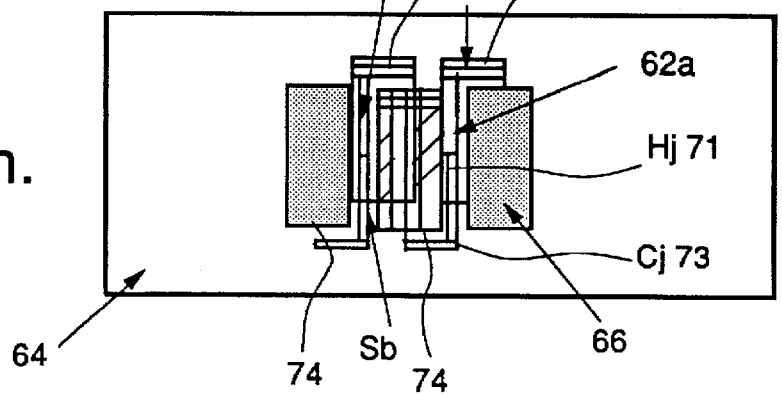
FIG. 3h is a planar view illustrating the resultant detector.
Figure 4A:
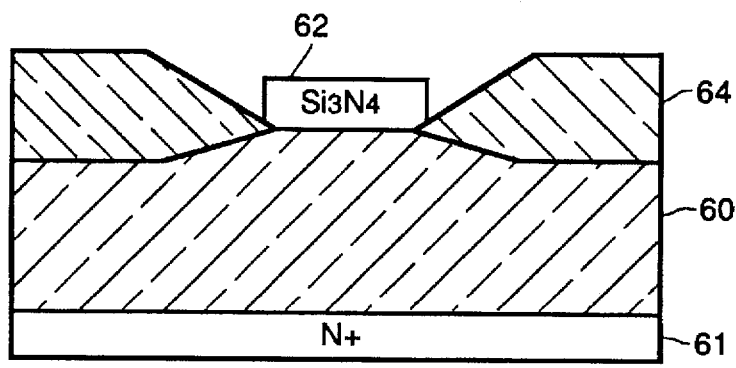
FIGS. 4a–4d are cross-sectional views, not to scale, illustrating a nitride bridge formation process without an underlying oxide (FIGS. 4a, 4b) and with an underlying support oxide (FIGS. 4c and 4d)
Figure 4B:
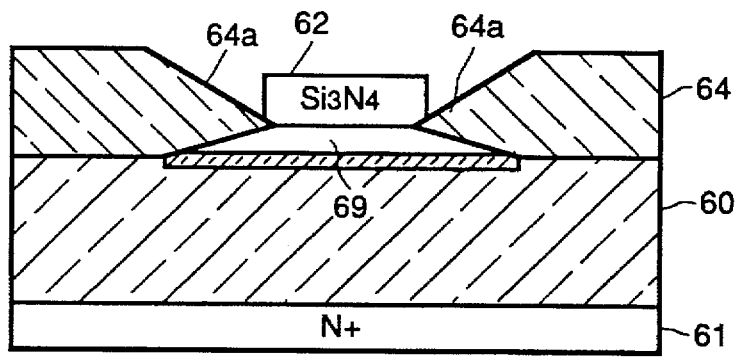
Figure 4C:
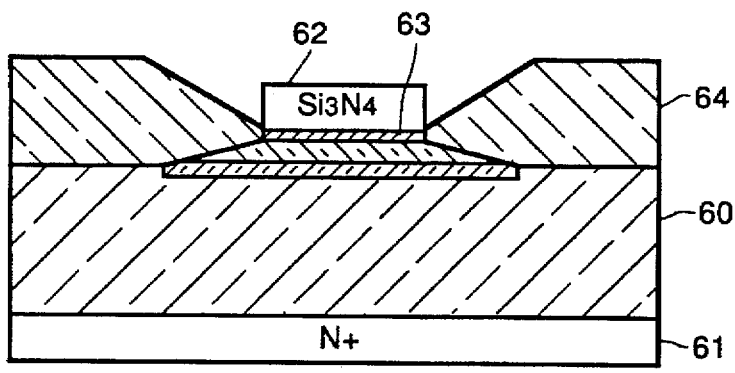
Figure 4D:
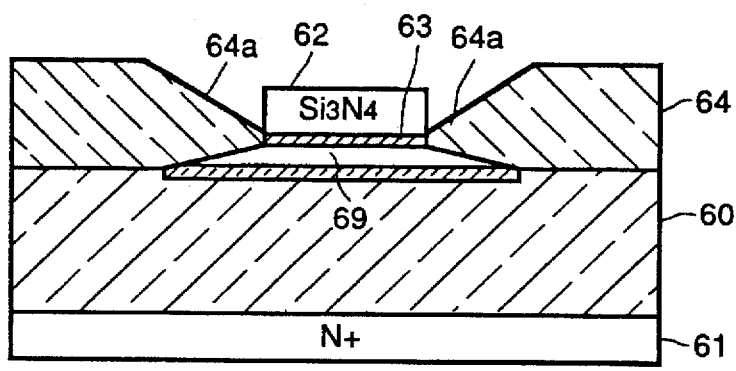

In this example, which is best illustrated in the planar view of FIG. 3h, the Bi and Sb thermocouples are employed with Au as a third layer to facilitate interconnection between the Bi and Sb, and also to any support circuits that are integrated on the silicon 60 or that are provided externally.

If a backside illuminated embodiment is desired, processing continues as in FIG. 1d to etch the thermal cavity under the buried silicon oxide layer 66, deposit the absorbing layer, and provide a suitable backside filter.

The planar view of the completed structure shown in FIG. 3h shows the formation of a serpentine arrangement of three pairs of hot junctions 71 (on the silicon nitride bridges 62a) and cold junctions 73 (on the oxide 64 on silicon 60) thermocouples. In this case the equivalent third cold junction is formed by the external connections to the separate gold leads 74 to the Bi and to the Sb, off of the nitride bridges 64a on which they lie. This implies a separate process step to etch the nitride bridges 64a and to undercut the nitride. During this step the less robust thermocouple materials (Sb and Bi) are protected by the photoresist 72, as is described below in reference to FIGS. 5a and 5b.

It should be noted that the Seebeck differential coefficient ($\alpha1Bi-\alpha2Sb$) or thermal power is independent of whether a bimetal or trimetal interconnect is used. However, the disclosed fabrication process is independent of the selection of the thermopile materials, which are preferably protected during the undercutting etch by being encased in the photoresist 72 (as is shown in the enlarged cross-sectional view of FIG. 5a). As a result, the process is fully compatible with and independent of the choice of thermopile materials. Furthermore, other thermopile materials which are more robust, more compatible with standard silicon processes, or which have other advantages, such as higher Seebeck coefficients, may be used instead of the Sb and Bi materials described thus far. These other materials include, but are not limited to, silicon (i.e. polysilicon); bulk silicon or amorphous silicon; or other less conductive metals or semi-metals or semiconductors formed during traditional silicon processes. Examples include: (1) Metal silicides or germanides (i.e., PtSi, PdSi, ErSi or the germanium analogs such as PdGe); (2) the conductive metal nitrides; or (3) higher Seebeck coefficient materials such as Te or BiTe.

Figure 5A:
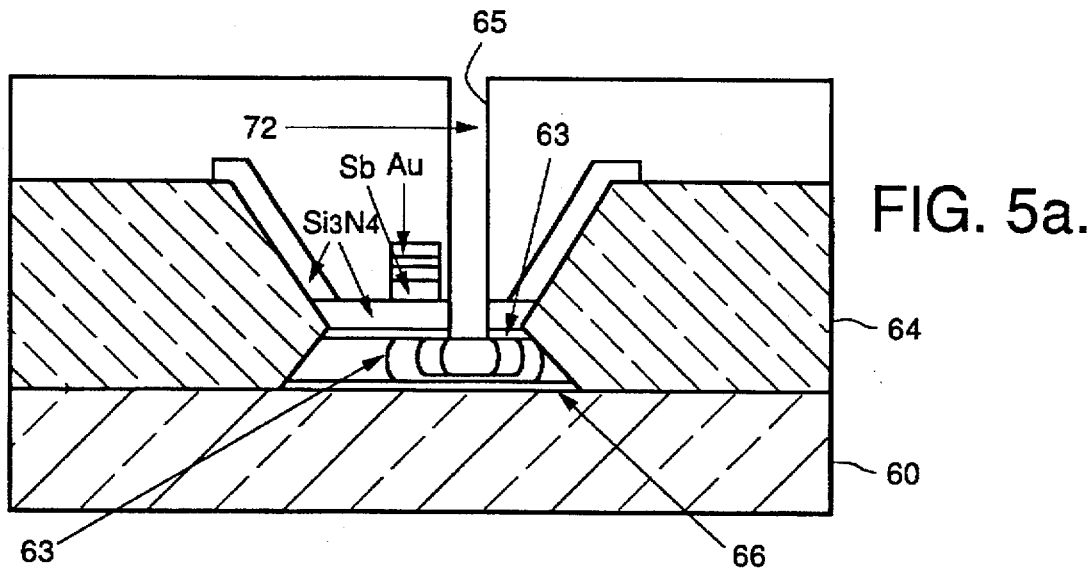
FIG. 5a is a cross-sectional view, not to scale, detailing a first delineation and undercutting etch process, wherein the thermopile is protected by photoresist prior to etching.
Figure 5A:
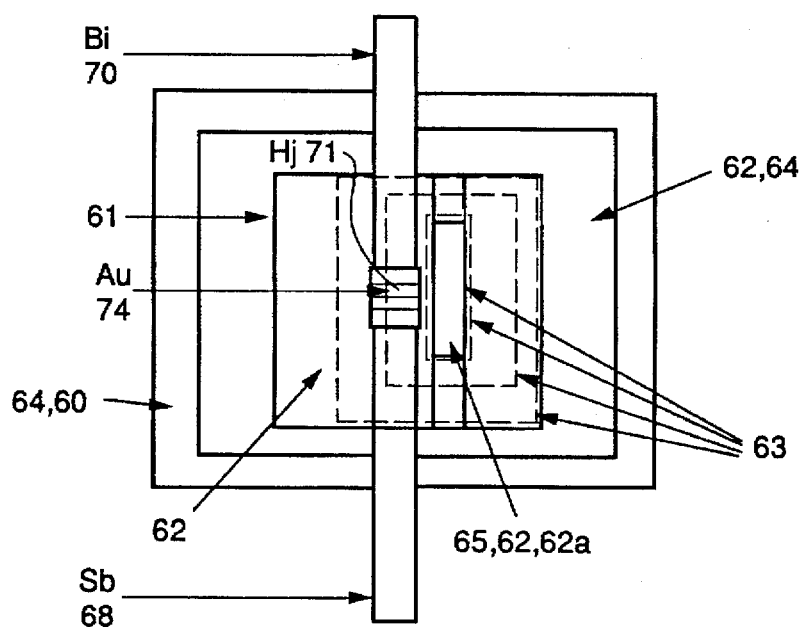

In FIGS. 5a and 5b the hole or slot 65 within the photoresist layer 72 and the underlying silicon nitride 62 is employed to enable the etch of the underlying silicon region 67 to form the void 69. In these Figures the designator 61 generally indicates the silicon cavity (void) boundary, and the designator 63 generally indicates the progression of the undercut etch contours. The slot 65 thus delineates the silicon nitride bridges 62a and also permits the initiation of the undercutting etch process. The hot junction 71 is formed at the interface of the Sb 68, Bi 70, and Au 74 metalization.

A further topside illuminated embodiment of this invention, illustrated in FIGS. 6a–6f, employs a thin silicon epitaxial layer 80 that is grown on a sapphire wafer 82. This composite substrate structure can be commercially obtained as a "Silicon-On-Sapphire" (SOS) wafer from a variety of sources.

Figure 6A:
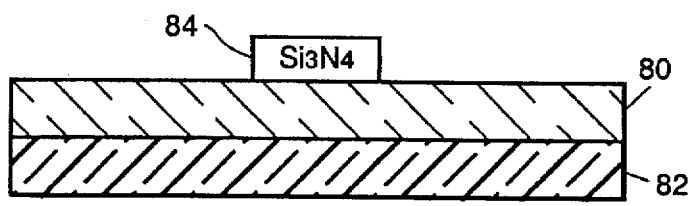
Figure 6B:
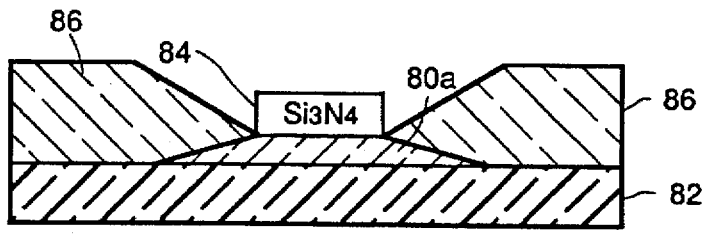
Figure 6C:
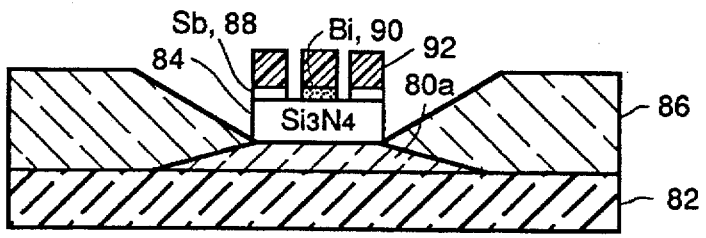
Figure 6D:
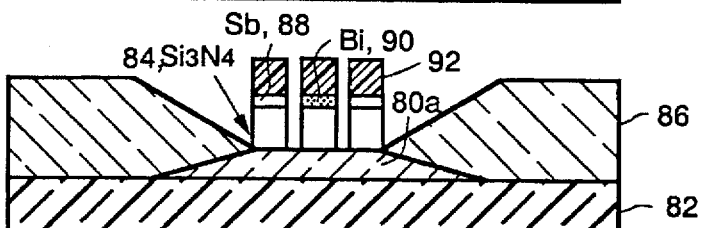
Figure 6E:
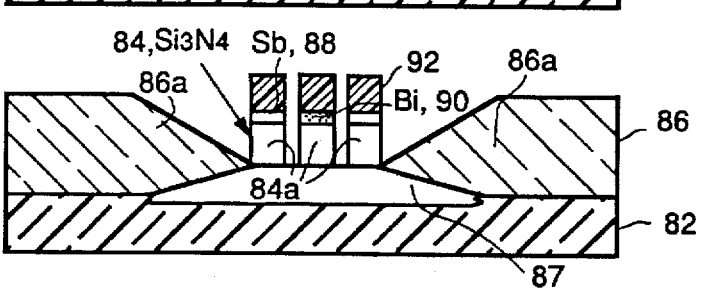

Processing is similar to that described above with respect to FIGS. 3a–3g, with the exception that the buried oxide layer is not implanted. That is, a silicon nitride region 84 is deposited to define the active area (FIG. 6a); and an isoplanar oxide layer 86 is grown into the silicon layer 80 so as to undercut the silicon nitride layer 84 (FIG. 6b) and form a silicon island or pedestal 80a. FIG. 6c shows the deposition of strips of Sb 88 and Bi 90, followed by the application of a layer of photoresist 92. FIG. 6d illustrates the patterning of the silicon nitride layer 84 by removal of those portions thereof that are not covered by metalization and photoresist. As in the embodiment of FIG. 3, the selective removal of the silicon nitride 84 may be self-aligned to the previously applied mask that defines the thermopile pattern of the nitride bridges (one bridge to each thermocouple). In FIG. 6e the silicon pedestal 80a that lies atop the sapphire substrate 82 is removed by a selective etch, thereby forming a void 87 that undercuts the remaining silicon nitride layer 84 and isoplanar oxide 86. This forms silicon nitride bridges 84a that are supported by the undercut portion 86a of the isoplanar oxide layer 86.

If a backside illuminated thermal detector is desired, processing continues as in FIG. 1d to form the thermal cavity within the sapphire substrate 82, deposit the absorbing layer, and provide a suitable backside filter.

This SOS embodiment is advantageous in that it readily enables the formation within the silicon layer 80 of CMOS and lateral bipolar circuits, and also high gain bipolar-MOS devices for amplification and processing of the thermal detector signals.

Figure 6F:
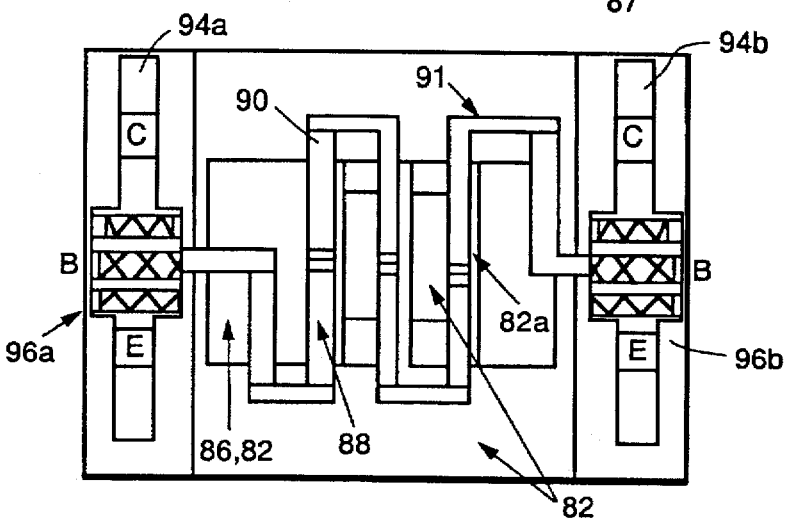
FIG. 6f is a planar view of the SOS thermopile detector showing associated lateral bipolar junction transistors (BJTs) forming a differential amplifier pair.

The example shown in FIG. 6f illustrates a differential bipolar transistor pair comprised of lateral bipolar junction transistors (BJTs) 94a and 94b that are fabricated by conventional semiconductor processing techniques within silicon islands 96a and 96b, respectively, that border the active region. Each of the BJTs 94a and 94b includes leads (for example aluminum) for contacting the collector (C) and emitter (E) terminals. A control or base (B) terminal of each BJT is coupled to one end of the serpentine thermopile structure comprised of the Sb 88, Bi 90, and Au 91 metalization, the three hot junctions of which are disposed upon the thermally isolating silicon nitride bridges 84a over the void 87 that is formed within the silicon layer 80. Transistor types other than BJTs can be employed in other embodiments of the invention.

The SOS embodiment of FIG. 6 is compatible with low resistance detectors such as thermopiles, thermocouples and bolometers. Furthermore, due to the relatively low silicon volume and good thermal conductivity of the sapphire substrate 82, the SOS-based sensor operates well at temperatures as high as 150° C. or more.

It should be realized that in all of the embodiments discussed thus far that any required support circuitry (e.g., amplifiers, A/D converters, etc.) may be fabricated within the device grade silicon material that forms a part of the initial SOI wafer, silicon wafer, or SOS wafer. That is, the thermal energy detector of this invention may be integrated with its attendant support circuitry through the use of conventional integrated circuit processing techniques. This facilitates the impedance matching of the thermal detector to the support circuitry, and furthermore increases the signal-to-noise ratio by minimizing conductor lengths and eliminating multiple levels of interconnections between the thermal detector and the support circuitry.

Figure 7A:
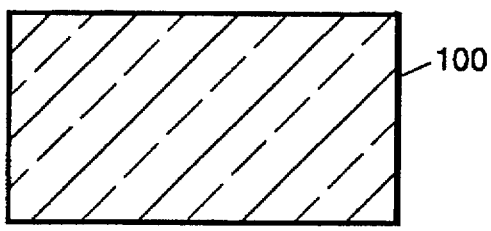
FIGS. 7a–7f are cross-sectional views, not to scale, that illustrate a frontside illuminated, filled-polymer thermal detector/VLSI compatible process in accordance with an embodiment of the invention.
Figure 7E:
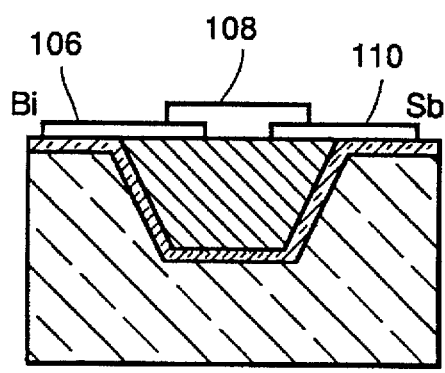
Figure 7B:
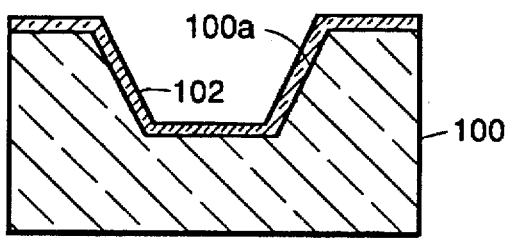
Figure 7F:
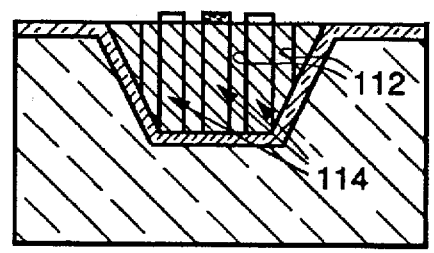
Figure 7C:
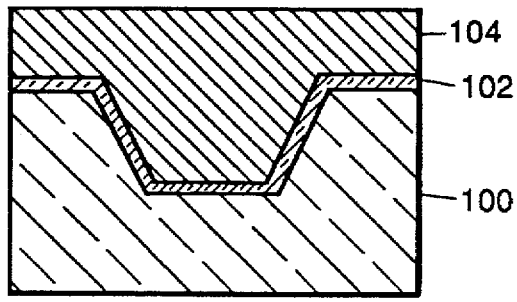
Figure 7D:
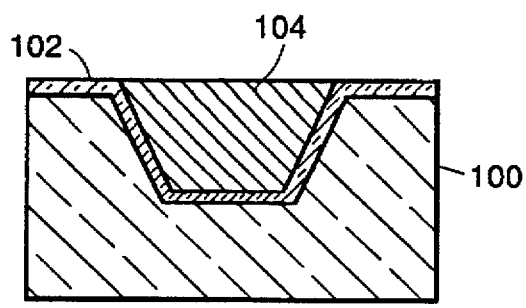

A silicon-based, frontside illuminated thermal detector embodiment that utilizes a low thermal conductivity polymer for thermal isolation is shown in FIGS. 7a–7g. Processing begins in FIG. 7a with a semiconductor (e.g., silicon) substrate 100. A hole or recess 100a is then etched into the substrate 100 (FIG. 7b). The recess 100a may have a depth of 100 micrometers, and a lateral extent that is also 100 micrometers. Next a thin layer of silicon oxide is grown over the surfaces of the substrate and recess 100a. In FIG. 7c the oxide covered recess 102 is filled with a low thermal conductivity polymer 104, such as a spun-on polyimide, and in FIG. 1d the structure formed thus far is planarized with a suitable wet or dry etch. This step leaves the oxide covered recess 100a filled with the polymer 104, and the oxide coating 102 exposed upon the top surface of the substrate 100. In FIG. 7e suitable masks are applied and Bi, Au, and Sb metalization (106, 108, 110, respectively) is selectively deposited over the oxide coating (forming cold junctions) and also over the polymer-filled recess (forming a hot junction). In FIG. 7f a mask is applied and trenches 112 are etched through the polymer 104, between the deposited metalization, so as to further reduce the thermal conductivity of the polymer 104. The trenches 112 thus form polymer bridges 114. As before, absorptive coatings and dielectric filter stacks are preferably formed over the hot junctions.

Figure 7G:
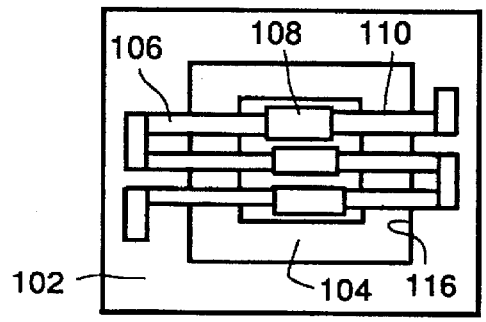
FIG. 7g is a planar view illustrating the interconnections of the thermopile arms to polymer bridges and silicon oxide.

FIG. 7g is a planar view of the structure showing a serpentine arrangement of Bi, Sb and Au metalization that forms a thermal detector having a plurality of hot junctions disposed on the polymer bridges 114 within the hole or recess formed within the oxide-covered silicon substrate 100. The hot junctions are thus thermally isolated from the silicon substrate 100. The perimeter of the hole or recess 100a is shown generally by the designator 116.

In this embodiment of the invention vertical rather than lateral isolation is afforded by the combination of deep etching, filling of holes with the low thermal conductivity polymer, planarization, and the deposition and delineation of the thermal detector. These processes are fully consistent with integrated circuit processing and the modern use of high temperature "spin-on" polymers such as polyimids. Any required support circuitry can also be fabricated within the device-grade silicon substrate 100 to facilitate impedance matching and to increase the signal-to-noise ratio.

The above described combination of low noise amplifiers, integrated thermopiles, spectral filters and absorbing coatings are clearly superior to conventional thermal sensor implementations in manufacturability, yield, signal to noise ratio and minimum detectable signal. For example, it is anticipated that a NeDT of 50 mK or less is achievable for an uncooled FPA that is constructed in accordance with this invention. The high degree of integration (i.e., thermal isolation, amplifiers, filters, and absorbing layers) significantly reduces the cost of the thermal sensors, thereby making the use of such sensors practical for high volume automotive emissions chemically-specific sensor applications (both on-board and roadside), industrial pollution monitoring applications, spectroscopy applications, and imaging applications.

One such exemplary application is illustrated in FIG. 9 as a system 120 that is intended to detect a concentration of one or more chemical species within a flow of material. By example, a broadband optical source 122 provides a beam (A) of electromagnetic radiation that is directed through a structure 124 that contains a flow (B) of material. As but one example, the flow (B) may be a gas stream that is generated by the operation of a vehicle or a furnace. The gas stream contains molecular species, such as hydrocarbons, CO, $CO_2$, $NO_x$ and $H_2O$, that may be a by-product of combustion. In order to determine the concentration of one or more of the molecular species the system 120 includes one or more of the novel thermal energy sensors 126 of this invention. Each thermal energy sensor 126, which may be constructed in accordance with any of the above described embodiments, has a dielectric filter stack that has a passband selected as a function of a range of wavelengths that are known to be absorbed by a chemical species of interest. The output of the sensor 126 is provided to suitable signal processing electronics, such as an amplifier 128 and a signal processor 130, some or all of which may be integrated within the same semiconductor substrate within which the thermal sensor(s) 126 is fabricated.

In operation, the optical source 122 provides the broadband beam (A) which passes through the gas stream (B). The presence of a chemical species of interest within the stream (B) results in the selective absorption of a portion of the band of wavelengths that comprise the beam (A). One of the thermal energy sensors 126 is provided with a filter that passes electromagnetic radiation within the band that is absorbed by the chemical species of interest and, as a result, is responsive to an intensity of the beam (A) within the absorption band. The electromagnetic energy within the passband is absorbed by the absorptive coating of the thermal sensor 126, is converted to thermal energy, and thus causes the thermal sensor (e.g., a thermopile sensor) to generate a detectable electrical signal that has a magnitude that is a function of the intensity of the beam (A) within the passband of the filter. This electrical signal is amplified and processed to provide, at an output 132 of the signal processor 130, a concentration of the chemical species within the flow (B).

Due to the small size and reduced cost of the thermal energy sensors of this invention, the entire system 120 can be installed within a vehicle or a chimney.

Although described primarily in the context of a sensor of thermal (IR) radiation, it should be appreciated that radiation within other wavelength bands can also be detected. For example, both visible and UV radiation can be detected by providing a suitable layer of absorbing material within the optical cavity, and a suitable passband filter that is disposed over the optical cavity.

Typical lateral dimensions for the active regions of each of the foregoing embodiments are in the range of approximately 100 micrometers to approximately 1000 micrometers. As such, it can be realized that an imaging array, such as an uncooled focal plane array, can be constructed to have a high density of radiation responsive sensors.

While the invention has been particularly shown and described with respect to a number of embodiments thereof, it will be understood by those skilled in the art that changes in form and details may be made therein without departing from the scope and spirit of the invention. For example, the teaching of this invention is not to be construed to be limited to only the particular materials, dimensions, and fabrication processes that are described above. By example, dielectric materials other than silicon nitride can be employed to form the bridge structures that support the hot junctions, so long as the selected dielectric material has the required strength to form a partially unsupported span and also has a low thermal and electrical conductivity. The use of silicon nitride is advantageous because of its structural, thermal and electrical properties, and also because the use of silicon nitride is compatible with conventional integrated circuit fabrication lines.

As such, the teaching of this invention is intended to be given a scope that is commensurate with the scope of the following claims.

What is claimed is:

1. A thermal energy sensor responsive to incident electromagnetic radiation having wavelengths of interest, comprising:

a substrate comprised of a semiconductor material and a layer of dielectric material disposed within said semiconductor material, said dielectric material layer being parallel to a first surface of said substrate, said substrate including at least one active region disposed within said first surface of said substrate wherein a portion of said semiconductor material is removed down to said dielectric layer;

a plurality of thermally-responsive junctions between dissimilar materials, at least one of said thermally-responsive junctions being a hot junction that is disposed within or over said active region; and means for thermally isolating said at least one hot junction from said substrate.

2. A sensor as set forth in claim 1 and further comprising:

a cavity formed within a second surface of said substrate in registration with said active region, said second surface being opposite said first surface and said cavity extending from said first surface to said layer of dielectric material, said cavity containing a radiation absorbing region that is thermally coupled to said at least one hot junction through an intervening portion of said dielectric layer, said at least one hot junction being disposed upon a portion of said dielectric layer that is exposed within said active region; and a filter that is optically coupled to said cavity for admitting radiation within a predetermined band of wavelengths into said cavity for absorption within said radiation absorbing region, said predetermined band of wavelengths including the wavelengths of interest.

3. A sensor as set forth in claim 1 wherein said substrate is comprised of a silicon-on-insulator structure comprising a lower layer, said layer of dielectric material disposed over a surface of said lower layer, and an upper layer comprised of said semiconductor material that is disposed over said dielectric material layer, wherein said active region is located where a portion of said upper layer is removed down to said layer of dielectric material.

4. A sensor as set forth in claim 1 wherein said layer of dielectric material is comprised of a buried oxide layer, and wherein said semiconductor material is removed down to said buried oxide layer within said active region.

5. A sensor as set forth in claim 1 wherein one of said dissimilar materials is bismuth and wherein a second one of said dissimilar materials is antimony.

6. A sensor as set forth in claim 1 wherein said dissimilar materials are selected from the group consisting essentially of polysilicon, bulk silicon, amorphous silicon, metal silicides including PtSi, PdSi, ErSi, metal germanides including PdGe, conductive metal nitrides, and high Seebeck coefficient materials including Te and BiTe.

7. A sensor as set forth in claim 1 wherein a portion of said semiconductor material is in an oxide form and forms supporting bridge structures that extend over a void in said semiconductor material wherein said portion of said semiconductor material is removed and where a portion of said layer of dielectric material is exposed, wherein said means for thermally isolating is comprised of said bridge structures that support said at least one hot junction above the void.

8. A sensor as set forth in claim 7 wherein said bridge structures further support a layer comprised of silicon nitride.

9. A sensor as set forth in claim 8 wherein said bridge structures are further comprised of a reinforcing member comprised of a silicon oxide.

10. A sensor as set forth in claim 7 wherein said oxide form of said semiconductor material is comprised of isoplanar oxide that is formed into the first surface of said substrate.

11. A sensor as set forth in claim 1 wherein said substrate has support circuitry fabricated within said semiconductor material adjacent to said first surface and over said dielectric material layer, said support circuitry being coupled to said plurality of thermally-responsive junctions.

12. A sensor as set forth in claim 11 wherein said plurality of thermally-responsive junctions are serially coupled together so as to have a first end and a second end, and wherein said support circuitry includes a first transistor having a control terminal coupled to said first end and a second transistor having a control terminal coupled to said second end.

13. A sensor as set forth in claim 1 wherein said plurality of thermally-responsive junctions form a thermopile.

14. A sensor as set forth in claim 1 wherein said substrate includes a plurality of said active regions that are arranged as a linear or a two-dimensional array of thermal energy sensors.

15. A sensor as set forth in claim 1, wherein said sensor is disposed relative to a flow of material for detecting electromagnetic radiation that passes through the flow.

16. A thermal energy sensor responsive to incident electromagnetic radiation having wavelengths of interest, comprising:

a substrate comprised of a layer of sapphire having a layer of semiconductor material disposed on a surface of said sapphire layer;

a portion of said layer of semiconductor material being in an oxide form and forming supporting bridges that extend over a void in said layer of semiconductor material wherein said underlying sapphire layer is exposed;

a structure comprised of a dielectric material that is supported by said bridges; and a plurality of thermally-responsive junctions between dissimilar materials, at least one of said thermally-responsive junctions being a hot junction that is disposed upon said structure for thermally isolating said at least one hot junction.

17. A sensor as set forth in claim 16 wherein said substrate has support circuitry fabricated within said layer of semiconductor material, said support circuitry being coupled to said plurality of thermally-responsive junctions.

18. A sensor as set forth in claim 17 wherein said plurality of thermally-responsive junctions are serially coupled together so as to have a first end and a second end, and wherein said support circuitry includes a first transistor having a control terminal coupled to said first end and a second transistor having a control terminal coupled to said second end.

19. A sensor as set forth in claim 16 wherein said plurality of thermally-responsive junctions form a thermopile.

20. A sensor as set forth in claim 16 wherein there are a plurality of said thermal energy sensors that are arranged as a linear or a two-dimensional array of thermal energy sensors.

21. A sensor as set forth in claim 16, wherein said sensor is disposed relative to a flow of material for detecting electromagnetic radiation that passes through the flow.

22. A thermal energy sensor responsive to incident electromagnetic radiation having wavelengths of interest, comprising:
- a substrate comprised of semiconductor material, said substrate having an opening that extends through a first surface towards an opposite surface;
- a layer of dielectric material covering inside surfaces of said opening and extending at least partially over a surrounding portion of said first substrate surface;
- a dielectric structure disposed within said opening and defining a plurality of dielectric sub-structures individual ones of which extend from a bottom of said opening towards said first surface of said substrate, said dielectric structure being comprised of a polymer; and
- a plurality of thermally-responsive junctions between dissimilar materials, at least one of said thermally-responsive junctions being a hot junction that is disposed upon a top surface of one of said dielectric sub-structures and being thermally isolated by said dielectric sub-structure from said substrate, at least one other one of said thermally-responsive junctions being a cold junction that is disposed upon a portion of said layer of dielectric material that extends over said surrounding portion of said first substrate surface.

23. A sensor as set forth in claim 22 wherein said substrate has support circuitry fabricated within said semiconductor material adjacent to said first surface, said support circuitry being coupled to said plurality of thermally-responsive junctions.

24. A sensor as set forth in claim 23 wherein said plurality of thermally-responsive junctions are serially coupled together so as to have a first end and a second end, and wherein said support circuitry includes a first transistor having a control terminal coupled to said first end and a second transistor having a control terminal coupled to said second end.

25. A sensor as set forth in claim 22 wherein said plurality of thermally-responsive junctions form a thermopile.

26. A sensor as set forth in claim 22 wherein there are a plurality of said thermal energy sensors that are arranged as a linear or a two-dimensional array of thermal energy sensors.

27. A sensor as set forth in claim 22, wherein said sensor is disposed relative to a flow of material for detecting electromagnetic radiation that passes through the flow.

28. A sensor for detecting electromagnetic radiation having wavelengths of interest, comprising:
- a substrate comprised of silicon and a buried layer of oxide disposed within said silicon, said buried oxide layer being parallel to a first surface of said substrate, said substrate including at least one void within said first surface of said substrate wherein a portion of said silicon is removed down to said buried oxide layer;
- bridge structures comprised of a dielectric material, said bridge structures disposed over said void;
- a plurality of thermally-responsive junctions between dissimilar materials, at least one of said thermally-responsive junctions being a hot junction that is supported by said bridge structures, said at least one hot junction being disposed beneath a layer of radiation absorbing material; and
- support circuitry fabricated within said silicon adjacent to said first surface, said support circuitry being coupled to said plurality of thermally-responsive junctions.

29. A sensor as set forth in claim 28, and further comprising a layer of wavelength selective material that is disposed over said layer of radiation absorbing material for passing electromagnetic radiation having the wavelengths of interest to said layer of radiation absorbing material.

30. A sensor as set forth in claim 28 wherein said plurality of thermally-responsive junctions are serially coupled together so as to have a first end and a second end, and wherein said support circuitry includes a first transistor having a control terminal coupled to said first end and a second transistor having a control terminal coupled to said second end.

31. A sensor as set forth in claim 28 wherein said plurality of thermally-responsive junctions form a thermopile.

32. A sensor as set forth in claim 28 wherein there are a plurality of said sensors fabricated by photolithographic techniques upon said substrate, said plurality of sensors being arranged as a linear or a two-dimensional array of sensors.

33. A sensor as set forth in claim 28, wherein said sensor is disposed relative to a flow of material for detecting electromagnetic radiation that passes through the flow.

\* \* \* \* \*